No. 711,957. Patented Oct. 28, 1902.
T. R. GARNIER.
BALL BEARING HUB.
(Application filed Feb. 20, 1902.)
(No Model.)
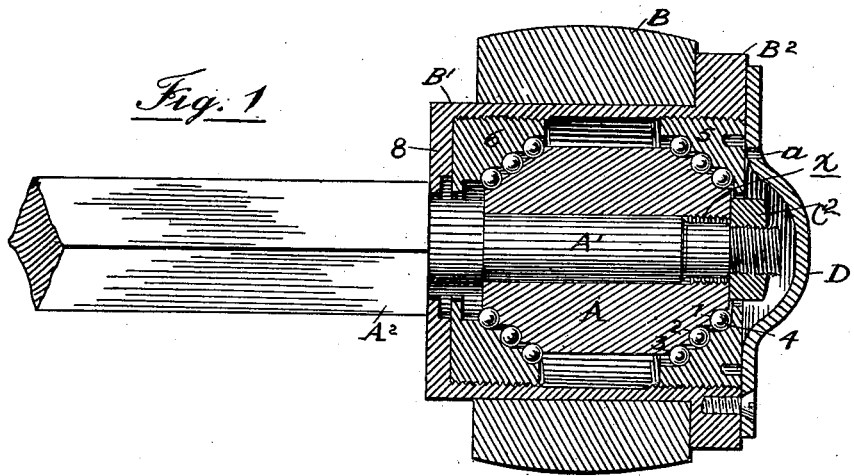
Fig. 1
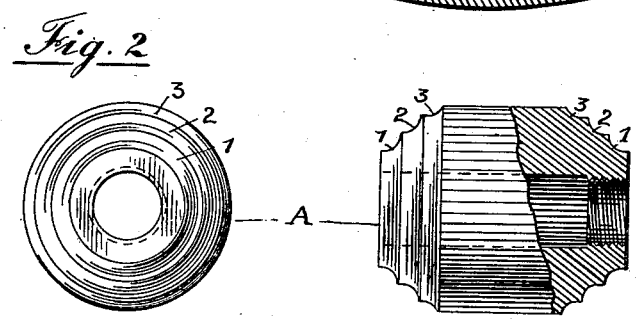
Fig. 2
Fig. 3
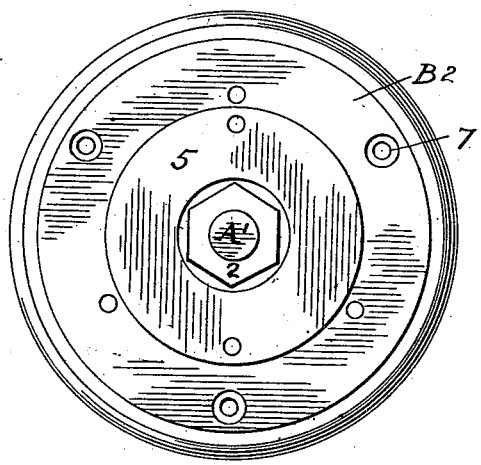
Fig. 4
WITNESSES:
Leon Boillot
Walter F. Vane
INVENTOR:
Thos. R. Garnier
by N. A. Acker
his Atty.
THE NORRIS PETERS CO., PHOTO-LITHO., WASHINGTON, D. C.

UNITED STATES PATENT OFFICE.

THOMAS R. GARNIER, OF LOS ANGELES, CALIFORNIA.

BALL-BEARING HUB.

SPECIFICATION forming part of Letters Patent No. 711,957, dated October 28, 1902.

Application filed February 20, 1902. Serial No. 94,868. (No model.)

*To all whom it may concern:*

Be it known that I, THOMAS R. GARNIER, a citizen of the United States, residing at Los Angeles, county of Los Angeles, State of California, have invented certain new and useful Improvements in Ball-Bearing Hubs; and I do hereby declare the following to be a full, clear, and exact description of the same.

The object of the invention is to provide an easy-running ball-bearing hub for use in connection with mine-cars, wagons, buggies, and vehicles generally, which shall be simple of construction, inexpensive, protected against dirt or dust entering the runways for the balls, and provide against wear to the journal of the axle.

To understand the invention, reference must be had to the accompanying sheet of drawings, wherein—

Figure 1 is a vertical sectional view taken through the center of the hub, the relative position of the parts being shown; Fig. 2, an end view of the bearing-sleeve. Fig. 3 is a detail view of the bearing-sleeve for the journal of the axle, and Fig. 4 is an end view of the hub with the cover-plate removed.

In the drawings the letter A is used to indicate the bearing-sleeve, which fits loosely upon the journal $A'$ of axle $A^2$. The bearing-sleeve is stepped at each end to form the concentric seats or grooves 1 2 3. Within each groove or seat is fitted a series of balls or rolls 4, which rolls or balls are held in place by the end plates 5 6. These end plates are formed with grooves or seats which register with those of the sleeve and bear upon the balls or rolls located within the respective seats or grooves.

Within the hub B is fitted the retaining-bushing $B'$, which bushing in the present case is provided at its outer end with the enlarged flange or shoulder $B^2$, which flange bears against the outer face of the hub and is attached thereto in any desirable manner, preferably by screws passing through the apertures 7 therein, Fig. 4. However, any suitable means may be employed to fasten the said bushing to the hub. The inner end 8 of the bushing is contracted, so as to prevent the end plate 6 being removed therefrom. Preferably this end plate is screwed into the lower or inner end of the bushing $B'$, similar to the end plate 5, which screws into the screw-threaded outer end of the said bushing. The end plates are thus held locked to the hub and against longitudinal movement or play and act as retainers for the bearing-balls. Any convenient tool adapted to engage the plates 5 and 6 may be employed for inserting or withdrawing them from the bushing. The hub thus formed is fitted upon the journal end $A'$ of axle $A^2$. The outer end of the journal is screw-threaded and projects slightly beyond the bearing-sleeve A and is held thereto by nut $C^2$, which nut bears firmly against the outer end of the bearing-sleeve. Being thus united, the sleeve remains stationary during rotation of the hub and wear thus eliminated from the journal. Such wear as takes place falls mainly upon the end plates 5 6, which when worn to any extent may be readily removed and new ones substituted therefor. After the hub has been secured to the journal $A'$ the cover or guard plate D is attached to flange or enlarged shoulder $B^2$ in order to protect the end plate and sleeve against dust or dirt entering therein. In this cover or guard plate an opening $a$ is formed, through which oil may be admitted in order to lubricate the parts. The oil thus admitted through the said plate gradually works between the end plate 5 and bearing-sleeve and into the seats or grooves for the balls or rolls.

While herein the bushing has been shown as applied to a journal having a smooth surface, it may be expedient to adapt the same for application to a journal having a screw-threaded surface, and to provide for such an exigency the interior of the bushing is screw-threaded for a short distance at one end, as at $x$, Fig. 1.

Having thus described the invention, what I claim as new, and desire protected by Letters Patent, is—

In a ball-bearing for hubs, the combination with a continuous bearing-sleeve adapted to fit over the journal of an axle, the extreme opposite ends of said sleeve being stepped to form a series of grooves, a bushing fitting loosely upon the bearing-sleeve and having an inwardly-projecting annular flange, end plates secured within the bushing, the inner end plate abutting the annular flange of the bushing and the outer end plate being adjustable within the outer end of said bushing, said plates having oppositely-disposed grooves arranged in a manner corresponding to the grooves at the ends of the bearing-sleeve and coöperating therewith to form ball-races at the respective ends of the hub, balls in said ball-races, means for clamping the parts in assembled operative relation, a cap for protecting the bearings, and an integral outwardly-projecting flange on the outer end of the bushing adapted to overlie the end of a hub and have secured thereto the aforementioned cap; substantially as described.

In witness whereof I have hereunto set my hand.

THOMAS R. GARNIER.

Witnesses:
N. A. ACKER,
WALTER F. VANE.